Feb. 12, 1952 D. G. SMELLIE 2,585,508
FILTER SHAKER FOR SUCTION CLEANERS
Filed Dec. 28, 1946 2 SHEETS—SHEET 1

INVENTOR.
Donald G. Smellie
BY
Harry S. Dunlap
ATTORNEY.

Feb. 12, 1952        D. G. SMELLIE        2,585,508
FILTER SHAKER FOR SUCTION CLEANERS
Filed Dec. 28, 1946        2 SHEETS—SHEET 2
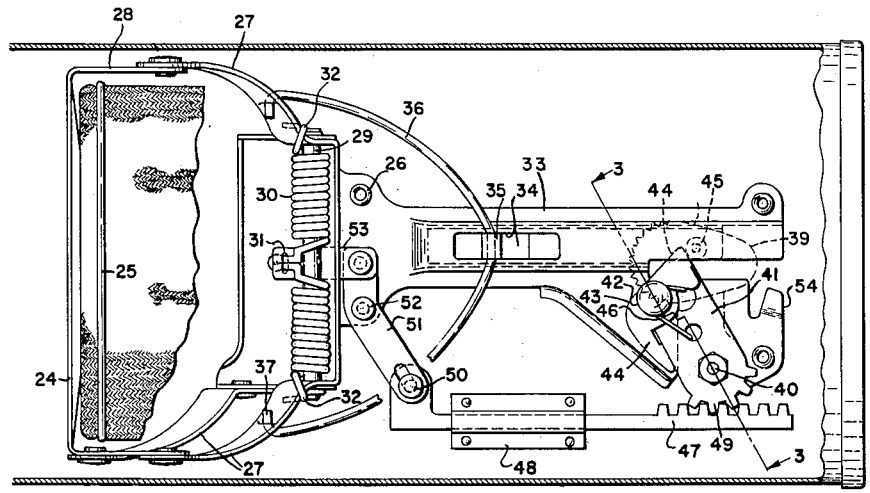
Fig. 2
Fig. 3
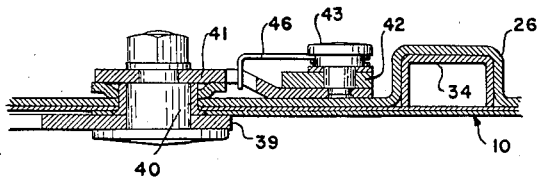
INVENTOR.
Donald G. Smellie
BY Harry S. Dumare
ATTORNEY.

Patented Feb. 12, 1952

2,585,508

UNITED STATES PATENT OFFICE 2,585,508

FILTER SHAKER FOR SUCTION CLEANERS

Donald G. Smellie, Canton, Ohio, assignor to The Hoover Company, North Canton, Ohio, a corporation of Ohio Application December 28, 1946, Serial No. 718,959

7 Claims. (Cl. 183—58)

This invention relates to suction cleaners in general and more particularly to a new and improved filter support and filter shaker mechanism.

Filter shakers for suction cleaners heretofore available fall into two broad categories, i. e. those which support the filter under slight tension permitting the filter to be agitated gently to dislodge dirt, and those which tension the filter walls abruptly with a sharp tensioning force. Shakers within the first mentioned category are ineffective and of little utility as applied to suction cleaners while the second type require the use of a strong walled filter which will withstand the sharp snapping action as well as prolonged strong tensioning between shaking operations.

The present invention provides a construction possessing the advantages of both types while avoiding the disadvantages of either. A single spring is utilized to energize the shaker as well as to return the manual actuator mechanism. Moreover, the single spring is arranged to maintain the filter lightly tensioned normally and to impart a strong and abrupt tensioning force to the filter briefly during the shaking operation. Upon the conclusion of the shaking operation, however, the strong temporary shaking tension provided by the spring is automatically decreased to an amount necessary to support the filter walls under slight tension. A major part of the decrease in tension is employed to return the actuating mechanism to its normal position in readiness for another shaking operation.

Accordingly, it is an objective of the invention to provide a new and improved filter shaking mechanism.

Another object is the provision of a snap-action type shaker employing a single spring.

Yet another object is to utilize a single spring to energize a filter shaker and to return the manual actuator therefor.

Still another object is the provision of a filter shaker in which the tension on the filter is decreased automatically and at a time subsequent to the conclusion of the shaking operation.

Further objects and advantages of the invention will become apparent from the following specification and drawings in which:

Figure 2 is a horizontal sectional view on line 2—2 of Figure 1; and

Figure 3 is a fragmentary sectional view on line 3—3 of Figure 2.

Figure 1:
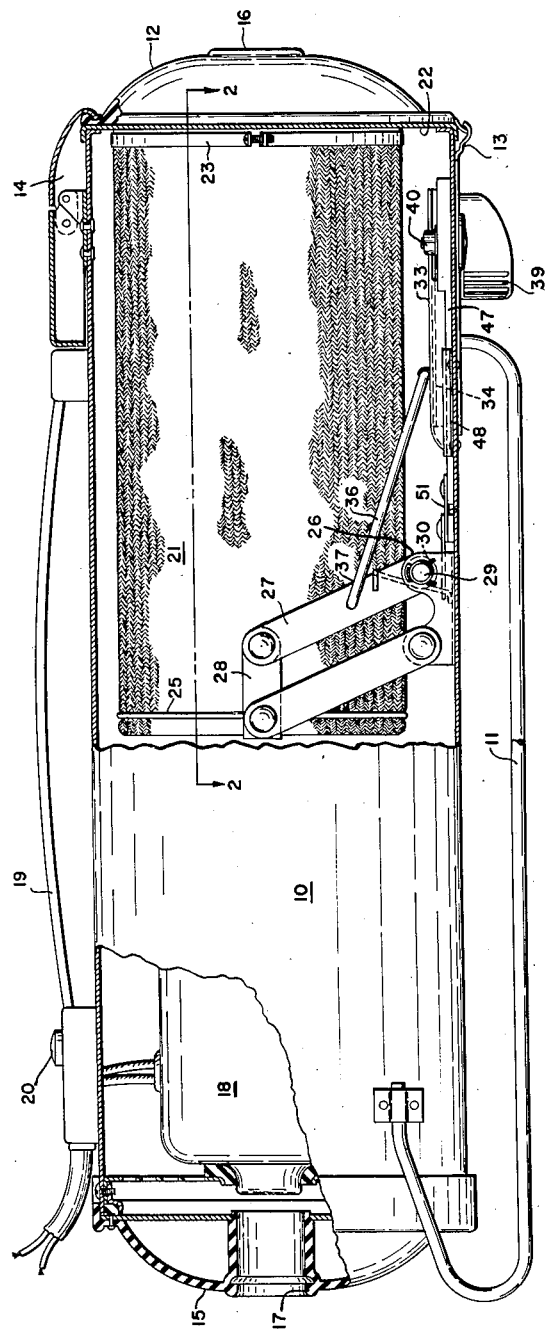
Figure 1 is a vertical sectional view through a suction cleaner incorporating the invention.

The invention is shown as incorporated in a suction cleaner of the tank type having a casing 10 supported upon a pair of runners 11. The suction inlet end of the casing is closed by a removable end cap 12 forming an airtight closure for casing 10. The lower side of cap 12 is provided with interlocking tabs 13 while the top side is releasably held in place by a toggle latch 14. The exhaust end of the casing is closed by a removable end cap 15. Cap 12 is provided with the usual suction hose coupling 16 while the exhaust cap carries a similar coupling 17. Any well known form of multi-stage motor-fan unit 18 may be appropriately supported near the exhaust end of casing 10. A convenient carrying handle 19 is attached to the upper side of the casing having an electric control switch 20 at one end thereof.

An air pervious filter bag of cloth or other suitable material 21 has its open inlet end secured to a flanged opening in partition 22 by means of a clamp 23. The closed end of the filter is secured to a supporting spider 24 by a split ring spring keeper 25.

The shaker mechanism for the filter comprises a bed-plate member 26 riveted to the inner, lower side of casing 10. Parallel links 27 are pivotally secured between the opposite sides of the rear end of bed-plate 26 and the ends of yoke 28 forming a part of spider 24. As indicated by Figure 2, only one pair of links 27 is required for one side of the filter support while the opposite side of the end of the yoke may be supported by a single link 27. The forward link on either side of the filter may be joined into a U-shaped member and the upper end of each leg may be pivotally connected to yoke 28. The lower, bight portion of this U-shaped member is pivotally supported between upstanding ears of bed-plate 26 by a pivot pin 29. A single coiled spring 30 surrounds pivot pin 29.

As will be clear from Figure 2, spring 30 is wound in opposite directions from its mid-portion 31 and its outer ends 32 are hooked about the forward side of links 27 so as to urge the links to rotate counterclockwise. The manner in which the mid-portion 31 of the spring is supported will be described below. From the foregoing, it will be clear that spring 30 acts through links 27, yoke 28 and spider 24 to move the closed end of the filter bag to the left so as to maintain the walls thereof under tension.

The shaker mechanism for shaking the filter vigorously to dislodge dirt will now be described. The forward end 33 of bed-plate 26 is of inverted U-shape in cross section to provide a raceway for a slide member 34. An overturned tab 35 projecting upwardly from slide 34 extends through an opening in the bed-plate and is secured to a wire bail 36 the ends of which are pivotally connected to an intermediate point 37 on links 27.

The actuator and trigger release mechanism operable to collapse the filter and then release it for abrupt tensioning includes a foot pedal 39 having one end pivotally supported upon the exterior under side of casing 10 and bed-plate 26 at 40. Pivot pin 40 is rigidly secured to the foot pedal as well as to an arm 41 positioned inside casing 10. The intermediate portion of a dog 42 is pivotally connected to arm 41 by a pin 43. The rearwardly extending arm 44 of the dog abuts the side of arm 41, while its forward nose portion 44 is positioned to normally abut a roller 45 carried by the forward end of slide 34. Torsion spring 46 surrounds pin 43 and is interconnected between dog 42 and arm 41 to urge the dog counterclockwise.

From the foregoing, it will be clear that when the foot pedal is rotated clockwise it carries arm 41 in the same direction causing nose 44 of dog 42 to abut roller 45 and move slide 34 in a direction to collapse the filter against the action of spring 30.

The automatic means for reducing the tension on spring 30 after the filter has been returned to its taut condition, as well as for returning the foot pedal to its initial starting position, will now be described. Essentially, the mechanism for accomplishing this purpose comprises a connection of any suitable type between the intermediate portion 31 of spring 30 and the manually operable mechanism for collapsing the filter. This connection may take various forms but as here shown comprises a toothed rack 47 slidably supported on the lower inner side of casing 10 by a guide plate 48. The toothed end of the rack is engageable with a toothed sector 49 formed as a part of arm 41. The opposite end of rack 47 has a lost motion connection 50 with lever 51 pivotally supported at 52 on bed-plate 26. The free end of lever 51 is connected to the downturned, intermediate portion 31 of spring 30 by means of a link 53.

It will thus be apparent from Figure 2 that as foot pedal 39 is depressed, rack 47 is moved longitudinally to the left rotating link 51 clockwise to increase the tension on torsion spring 30. At the same time, nose 44 of dog 42 moves slide 34 to the right to collapse the filter and to increase the tension on the outer ends 32 of spring 30. However, due to the difference in the effective lever arms acting on the intermediate portion 31 and the outer ends 32 of spring 30, stress increase on the intermediate portion 31 of the spring occurring on the depression of foot pedal 39 is appreciably less than that applied to the outer ends 32. It will also be understood that in normal operation the user depresses the foot pedal and holds it depressed for a brief interval after nose 44 has by-passed roller 45 to release bail 36. As a consequence, the outer ends of spring 30 snap the filter taut before the operator can possibly remove his foot from the pedal. Accordingly, the filter is held taut under the stresses imposed on ends 32 of spring 30 plus the additional stress placed on intermediate portion 31 thereof as the result of the linkage connection with foot pedal 39. This additional stress is utilized to return the foot pedal and arm 41 to its initial starting position. These important features of the invention will be better understood from the more detailed description of the mode of operation set forth below.

*Operation*

Let us assume that a cleaner is assembled as shown in Figure 1. The operator connects the flexible hose to either inlet coupling 16 or exhaust coupling 17 depending upon whether it is desired to clean by suction, as normally, or by blowing. After the cleaner has been in operation for a period of time, a body of dirt will have collected in filter 21. By virtue of the present invention, the filter can be emptied and restored to its original clean condition quickly and simply. First, the operator unlatches and removes end cap 16. The cleaner is then up-ended onto the open end whereupon the major portion of the dirt falls out into a receptacle or onto a paper previously laid beneath the open end.

To remove dirt adhering to the side walls of the filter, the user steps onto pedal 39 rotating it downwardly toward the floor until arm 41 abuts a stop 54 struck upwardly from bed-plate 26. Rotation of arm 41 moves dog 42 clockwise, as viewed in Figure 2, so that nose 44 strikes roller 45 on slide 34. This moves the slide downwardly in guideway 33 until nose 44 over-rides roller 45. As the slide 34 moves downwardly, it carries bail 36 and parallel linkage 27 downwardly very considerably increasing the stress on spring 30. At the same time, yoke 28 and the inner end of the filter bag is moved downwardly to collapse the side walls of the filter. As arm 41 rotates clockwise it also moves rack 47 upwardly to rotate lever 51 clockwise, further increasing the stress on the intermediate portion 31 of spring 30. However, as explained above, the stress increase imposed upon the intermediate portion of the spring by rack 47 is appreciably less than that imposed upon the outer end by movement of slide 34.

At the instant nose 44 over-rides roller 45, slide 34 is released and the very considerable energy stored in spring 30 acts through links 27 and yoke 28 to snap the filter taut sharply and abruptly. This action is highly effective in dislodging dirt clinging to the interior of the filter. Moreover, the snapping of the filter occurs instantaneously and before the user can remove his foot from pedal 39. As he does so, the additional unrelieved stress on spring 30 acts through lever 51 and rack 47 to return arm 41 and foot pedal 39 to their initial starting position. As this occurs, dog 42 rotates clockwise permitting nose 44 to under-ride roller 45 and assume its normal position thereabove as illustrated in Figure 2. Thus, it will be readily understood that intermediate portion 31 of spring 30 moves in a direction to decrease the tension thereon. This decrease in tension is reflected through links 27 and yoke 28 with the result that the filter is then under sufficient pressure to prevent slackness in the filter walls and to maintain the same under slight tension.

If a single operation of the shaker is not completely effective to restore the full efficiency of the filter, the shaker mechanism may be operated one or more times until the filter is completely freed of clinging dirt. Thereafter the cleaner is returned to a supporting position upon runners 11 and and end cap 12 is replaced restoring the cleaner to duty for further cleaning.

While only a single embodiment of the invention has been described in detail, it will be readily apparent that the novel features thereof may be incorporated in various arrangements without departing from the spirit of the invention or the inventive principles thereof.

What is claimed is:

1. In combination, a suction cleaner casing, a filter bag within said casing having one end supported thereby, linkage means connected to the opposite end of said bag including a spring for normally biasing said bag in a direction to maintain the walls thereof under slight tension, manually operable means connected to said spring and linkage means for collapsing said filter bag and simultaneously stressing said spring and including a releasable connection which opens after a predetermined movement of said manually operable means whereby the energy stored in said spring operates to tension said filter abruptly to dislodge dirt therefrom, and linkage means providing a permanent connection between said spring and said manually operable means for additionally stressing said spring as said filter is collapsed whereby, upon the opening of said releasable connection, the energy stored in said spring during the collapse of said filter is available to tension the same abruptly, to return said manually operable means to the initial position thereof and to reclose said releasable connection.

2. In combination, a suction cleaner casing, a filter within said casing having one portion thereof supported by said casing, filter shaker mechanism comprising a lever pivotally supported by said casing and having one end thereof connected to said filter so as to tension the walls thereof substantially uniformly, spring means having one end connected to said lever and urging the same in a direction to tension said filter slightly, manually operable means movable between a normal rest position and a second position, means including a releasable connection interconnecting said lever and said manually operable means, said releasable connection being operable to open after a predetermined movement of said manually operable means, and means connecting the opposite end of said spring means and said manually operable means whereby movement of said manually operable means away from the rest position thereof collapses said filter and stresses said spring means until said releasable connection opens whereupon the energy stored in said spring means tensions said filter abruptly to dislodge dirt, returns said manually operable means to the rest position thereof and closes said releasable connection.

3. In combination, a suction cleaner casing, an elongated filter bag in said casing having an open end supported thereon, a U-shaped member straddling the closed end of said filter having its free ends secured to the closed end of the filter and its bight portion pivotally supported within said casing, spring means biasing said U-shaped member in a direction to tension the walls of said filter, a bail member connected to the legs of said U-shaped member, a manually operable lever supported on said casing, means providing a normally closed releasable connection between said bail member and said lever, said releasable connection being operable to open when said lever is moved through a predetermined angle, and linkage means having one end connected to said spring means and the opposite end connected to said manually operable lever so that said spring means biases said lever to a normal rest position in which said releasable connection is closed, whereby said lever is operable to collapse said filter against the bias of said spring means by moving the closed end of said filter toward said open end until said releasable connection opens whereupon the energy stored in said spring means snaps said filter taut abruptly, returns said lever to the rest position thereof and closes said releasable connection.

4. In combination, an air pervious filter, stationary means for supporting one end of said filter while leaving the remainder of said filter free for shaking, a shaker mechanism for shaking said filter to dislodge dirt therefrom comprising manually operable means movable between a normal rest position and an operated position, linkage means interconnecting the unsupported part of said filter and said manually operable means, said linkage means including a spring urging said manually operable means to the rest position thereof and holding the walls of said filter extended and under slight tension, and rigid linkage means interconnecting the unsupported part of said filter and said manually operable means for collapsing said filter against the opposition of said spring, said rigid interconnecting means including a releasable connection which opens when said manually operable means has collapsed said filter to a predetermined position whereby said spring snaps said filter taut abruptly to dislodge dirt therefrom and thereafter returns said manually operable means to the rest position thereof and closes said releasable connection.

5. The combination defined in claim 4 wherein said manually operable means includes a lever pivotally supported intermediate the ends thereof and wherein said spring biased linkage means and said rigid linkage means are connected to said lever on the opposite sides of the pivotal support therefor.

6. In combination with a suction cleaner casing having an elongated filter bag therein, means connecting the open end of said bag to said casing, shaker mechanism connected to the closed end of said bag comprising manually operable means supported on said casing and being movable over a limited range between a normal rest position and an extended position, spring means having one end thereof connected to the closed end of said bag and the other end connected to said manually operable means and operable normally to hold said manually operable means in said rest position and the walls of said bag extended under slight tension, and linkage means connected in parallel with said spring means between the closed end of said bag and said manually operable means, said linkage means including a normally closed releasable connection operable to open as said manually operable means approaches the extended position thereof whereby movement of said manually operable means by an externally applied force collapses said filter bag toward the open end thereof against the opposition of said spring means until said releasable connection opens whereupon the energy stored in said spring means tensions the walls of said bag abruptly and thereafter returns said manually operable means to said rest position and closes said releasable connection.

7. In combination with a suction cleaner having a filter mounted therein, shaker mechanism for said filter normally holding said filter extended but operable to collapse said filter and tension it abruptly, comprising a movable support for one end of said filter, a manually operable lever, members providing a first and a second parallel connection between said support and said lever, a normally closed releasable connection in said first parallel connection, means for opening said releasable connection when said filter has been collapsed to a predetermined position, and a normally substantially relaxed spring interposed in and forming part of said second parallel connection operable to hold said filter taut under slight tension and to hold said lever in a rest position wherein said releasable connection is closed whereby movement of said lever out of said rest position in opposition to said spring operates to collapse said filter until said releasable connection opens thereby allowing said spring to tension said filter abruptly and to thereafter return said lever to its rest position and close said releasable connection.

DONALD G. SMELLIE.

REFERENCES CITED

The following references are of record in the file of this patent:

UNITED STATES PATENTS

| Number | Name | Date |
|---|---|---|
| 971,013 | Smith | Sept. 20, 1910 |
| 1,295,711 | Dod | Feb. 25, 1919 |
| 1,554,791 | Cutter | Sept. 22, 1925 |
| 1,765,720 | Goodloe | June 24, 1930 |
| 1,864,622 | Sutherland | June 28, 1932 |
| 1,933,105 | Forsberg | Oct. 31, 1933 |
| 2,022,249 | Lofgren | Nov. 26, 1935 |
| 2,077,572 | Lofgren | Apr. 20, 1937 |
| 2,192,357 | Leathers | Mar. 5, 1940 |
| 2,211,934 | McAllister | Aug. 20, 1940 |
| 2,304,309 | Leathers | Dec. 8, 1942 |
| 2,414,564 | Silverman et al. | Jan. 21, 1947 |
| 2,498,098 | Segesman | Feb. 21, 1950 |
| 2,498,102 | White | Feb. 21, 1950 |

FOREIGN PATENTS

| Number | Country | Date |
|---|---|---|
| 700,388 | Germany | Mar. 6, 1941 |